United States Patent
Wu et al.

(10) Patent No.: US 11,765,217 B1
(45) Date of Patent: Sep. 19, 2023

(54) DYNAMIC CONGESTION CONTROL THROUGH REAL-TIME QOS MONITORING IN VIDEO STREAMING

(71) Applicant: Amazon Technologies, Inc., Seattle, WA (US)

(72) Inventors: Yongjun Wu, Bellevue, WA (US); Ravindra Ganti, Sammamish, WA (US); Charles M. Cordova, Seattle, WA (US); Nicholas Sidwell, Seattle, WA (US); John F. X. Gaquin, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/443,011

(22) Filed: Jul. 19, 2021

Related U.S. Application Data

(63) Continuation of application No. 16/948,571, filed on Sep. 23, 2020, now Pat. No. 11,102,260.

(51) Int. Cl.
| | |
|---|---|
| *H04L 65/613* | (2022.01) |
| *H04L 65/80* | (2022.01) |
| *H04L 65/65* | (2022.01) |
| *H04L 65/612* | (2022.01) |

(52) U.S. Cl.
CPC ......... *H04L 65/613* (2022.05); *H04L 65/612* (2022.05); *H04L 65/65* (2022.05); *H04L 65/80* (2013.01)

(58) Field of Classification Search
CPC ... H04L 65/4092; H04L 65/80; H04L 65/608; H04L 65/4084; H04L 65/613; H04L 65/612; H04L 65/65
See application file for complete search history.

(56) References Cited

U.S. PATENT DOCUMENTS

| | | | |
|---|---|---|---|
| 8,924,580 B2 * | 12/2014 | Begen | H04N 19/154 |
| | | | 709/219 |
| 9,392,042 B1 * | 7/2016 | Caballero | H04L 65/612 |
| 9,613,042 B1 | 4/2017 | Joseph et al. | |
| 9,866,605 B2 * | 1/2018 | Begen | H04N 21/6125 |
| 10,178,043 B1 * | 1/2019 | Ganjam | H04L 65/764 |
| 10,432,690 B1 * | 10/2019 | Li | H04L 65/612 |
| 10,992,721 B2 * | 4/2021 | Andersson | H04L 65/613 |
| 11,064,230 B2 * | 7/2021 | Nielsen | G06F 16/9574 |
| 11,102,260 B1 * | 8/2021 | Wu | H04L 65/612 |

(Continued)

FOREIGN PATENT DOCUMENTS

| | | | |
|---|---|---|---|
| EP | 3249933 A1 * | 11/2017 | |

OTHER PUBLICATIONS

U.S. Appl. No. 16/948,571, filed Sep. 23, 2020, Wu et al.

(Continued)

*Primary Examiner* — Oanh Duong
(74) *Attorney, Agent, or Firm* — Weaver Austin Villeneuve & Sampson LLP

(57) ABSTRACT

Methods and apparatus are described for providing thinned manifests during a live event. As network usage of a regional internet service provider (ISP) or content delivery network (CDN) becomes unsustainable, new streaming sessions for a live event are provided a thinned manifest that does not have playback options for bitrates above a bitrate limit.

18 Claims, 4 Drawing Sheets

(56) References Cited

U.S. PATENT DOCUMENTS

| | | |
|---|---|---|
| 2008/0229215 A1* | 9/2008 | Baron .................... G06N 3/006 |
| | | 715/751 |
| 2013/0097309 A1 | 4/2013 | Ma et al. |
| 2014/0281002 A1 | 9/2014 | Sun |
| 2018/0176623 A1* | 6/2018 | Nugent .............. H04N 21/6547 |
| 2019/0007756 A1* | 1/2019 | Navali ................ H04L 63/0428 |
| 2019/0020734 A1 | 1/2019 | Giladi et al. |
| 2019/0069038 A1 | 2/2019 | Phillips |
| 2019/0069039 A1 | 2/2019 | Phillips |
| 2019/0173931 A1* | 6/2019 | Gordon .................. H04L 67/02 |
| 2020/0106815 A1 | 4/2020 | Wang et al. |
| 2020/0358839 A1 | 11/2020 | Mahvash et al. |

OTHER PUBLICATIONS

U.S. Office Action dated Feb. 4, 2021 issued in U.S. Appl. No. 16/948,571.

U.S. Notice of Allowance dated Apr. 30, 2021 issued in U.S. Appl. No. 16/948,571.

U.S. Notice of Allowability dated May 17, 2021 issued in U.S. Appl. No. 16/948,571.

* cited by examiner

DYNAMIC CONGESTION CONTROL THROUGH REAL-TIME QOS MONITORING IN VIDEO STREAMING

INCORPORATION BY REFERENCE

An Application Data Sheet is filed with this specification as part of this application. Each application to which this application claims benefit or priority as identified in the Application Data Sheet is incorporated herein by reference in its entirety and for all purposes.

BACKGROUND

Live events (e.g., sporting events or concerts) may be streamed in real time by providing live manifests throughout the event to provide information on the most recently encoded fragments available. As the number of concurrent sessions for a live event grows, each client device may request content at the highest bitrate sustainable by that client device. This may exhaust the resources of a local internet service provider (ISP) network or content delivery network (CDN), causing buffering or dropped sessions.

DETAILED DESCRIPTION

This disclosure describes techniques for thinning manifests for live events to avoid exceeding the available network resources of regional internet service providers (ISPs) or content delivery networks (CDN). As an ISP and/or CDN approach their capacity for streaming an event, a maximum bitrate may be set that limits the bitrate options provided in a live manifest. Thinned manifests are generated that do not include bitrate options above the maximum bitrate. New and/or existing sessions are provided the thinned manifests, and thus are limited in the maximum bitrate that can be requested. This reduces the bandwidth used by new sessions, allowing the ISP or CDN to avoid exceeding their available bandwidth. An example may be instructive.

Figure 1:
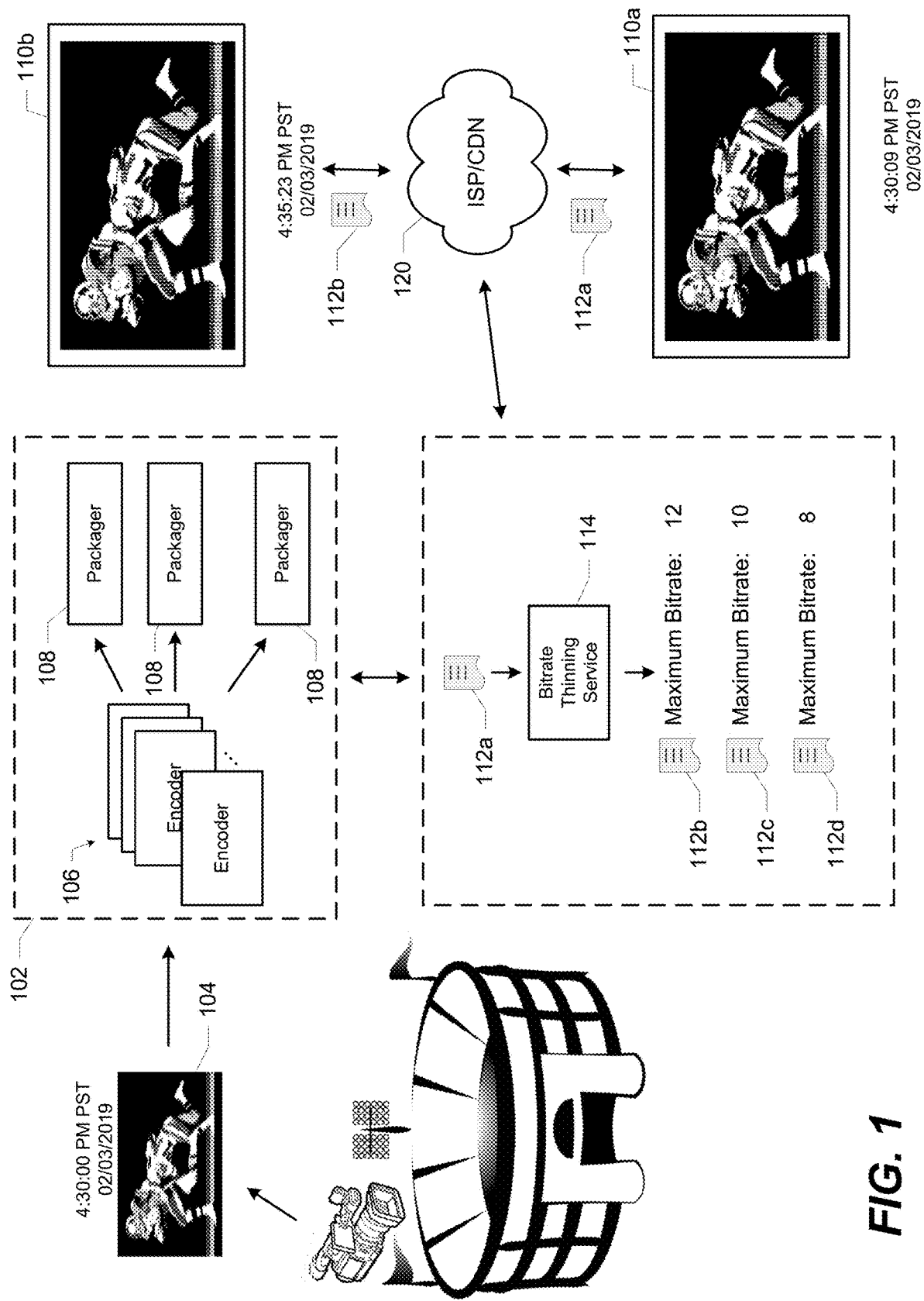
FIG. 1 illustrates an example of a particular class of implementations for thinning manifests in response to network conditions.

FIG. 1 shows a live content service 102 that captures video 104 of a live event (in this example a football game) using one or more video cameras. Service 102 encodes (using encoders 106) and packages (using packagers 108) the captured video for delivery as a plurality of live streams that include different quality-level and bitrate versions of the content, delivered according to a number of streaming protocols including, for example, HTTP Live Streaming (HLS), Dynamic Adaptive Streaming over HTTP (DASH), and Smooth Streaming. Live streaming clients (e.g., tablet 110a) consume the live content (delayed only a few seconds from the live action) using live manifests 112a that are periodically made available by service 102 (e.g., generated by packagers 108) as additional content is encoded and packaged. Fragments of content are then delivered over ISP/CDN 120.

As live manifests are generated, they are passed to a bitrate thinning service 114 that generates thinned manifests in response to, for example, an indication that the utilization of network resources is too high. Live manifests 112b-d are thinned to varying extents relative to live manifest 112a based on various maximum bitrates, for example 12, 10, and 8 Mbps, while live manifest 112a is not thinned. Initially, all live streaming clients may be provided manifest 112a having all bitrate versions of the content. Clients may then request fragments of live content available in manifests 112a.

While the live event is ongoing, it may be determined based on various network conditions that the current usage of ISP or CDN resources is unsustainable. Exceeding certain usage levels could potentially interrupt the live streaming for clients and could cause sessions to buffer or fail. To reduce the likelihood of this, a maximum bitrate is selected based on the level of network resource usage that corresponds to one of the thinned manifests 112b-d such as, for example, thinned manifest 112b. New sessions connecting to the live event are then provided thinned manifest 112b (which in this example does not have playback options with bitrates above 12 Mbps) to reduce the load that new sessions may put on the ISP and/or CDN resources.

After a decision to use thinned manifests is made, live streaming client 110b may then connect to ISP/CDN 120 to stream the live event, requesting a manifest so that it can begin streaming fragments for playback. Thinned manifest 112b is provided to live streaming client 110b, which then requests fragments based on the options provided in thinned manifest 112b. As there are no options having a bitrate greater than 12 Mbps, live streaming client 110b cannot request fragments having a higher bitrate, thereby reducing the network resources that live streaming client 110b might otherwise consume from the ISP and/or CDN. As network conditions change, the manifest provided to new sessions may change, either by reducing the maximum bitrate, e.g., thinned manifests 112c-d, or by removing the maximum bitrate cap and providing manifest 112a.

Figure 2:
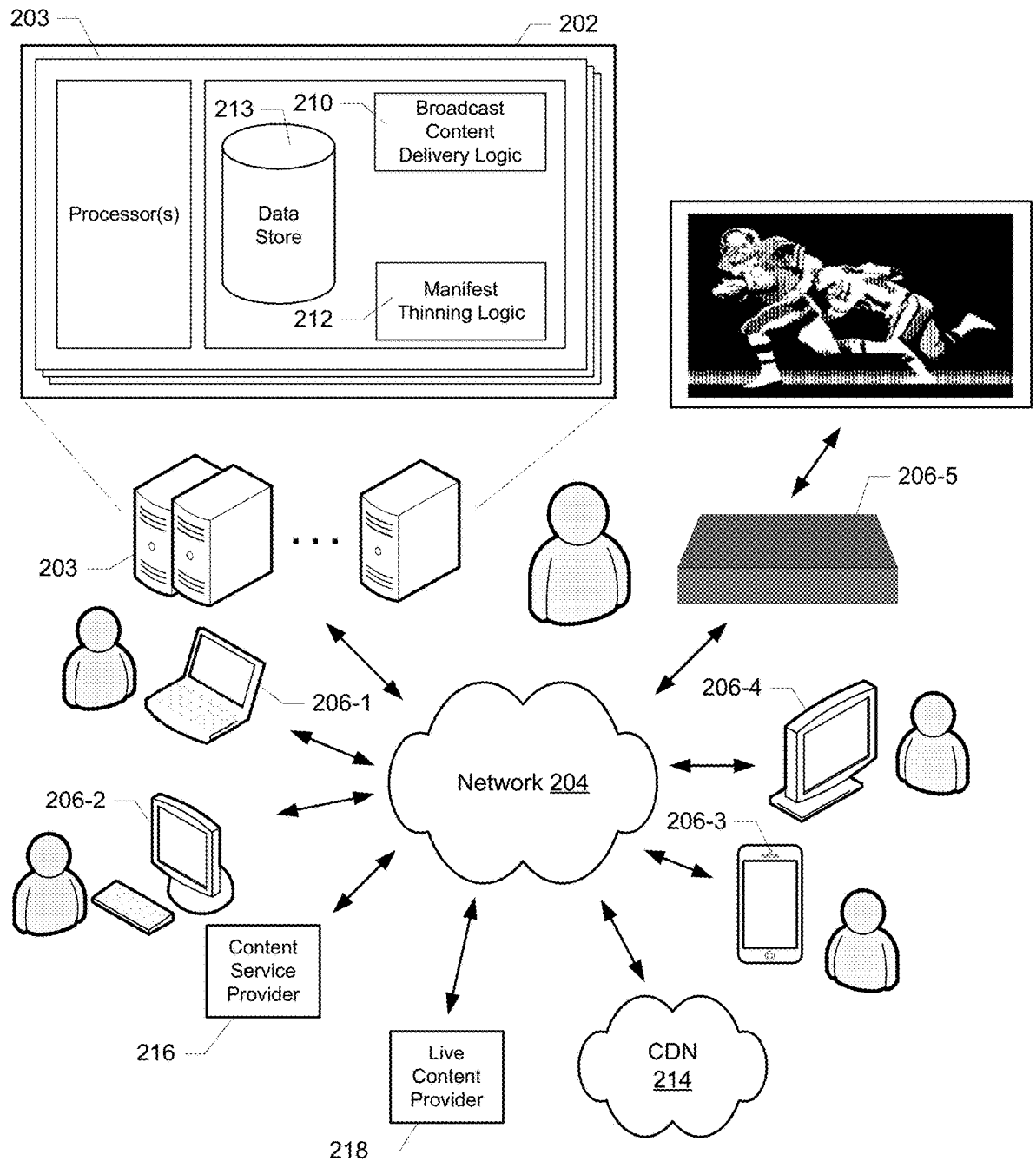
FIG. 2 illustrates an example of a computing environment in which implementations enabled by the present disclosure may be practiced.

FIG. 2 illustrates an example of a computing environment in which a video content service 202 provides video content via network 204 to a variety of client devices (206-1 through 206-5) in accordance with the techniques described herein. The video content may include live or broadcast content, conventional VOD content, and/or on-demand content as described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides content to client devices. However, it will be understood that content service 202 may provide access to content in conjunction with one or more content delivery networks (e.g., CDN 214) that may or may not be independent of content service 202. In addition, the source(s) of the content may be independent of or integrated to various degrees with content service 202 (e.g., as represented by content provider server 216 and live content provider 218). The range of variations known to those of skill in the art are contemplated to be within the scope of this disclosure.

In addition to broadcast content delivery logic 210 (which facilitates various aspects of content delivery to client devices 206), content service 202 may include manifest thinning logic 212 that facilitates the thinning, or removal, of various bitrates from live manifests.

In addition to providing access to video content, content service 202 may also include a variety of information related to the video content (e.g., live content and associated metadata and manifests in data store 213 to which service 202 provides access). Alternatively, such information associated with and/or about the content, as well as the content itself may be provided and/or hosted by one or more separate platforms, e.g., CDN 214 or remote cloud storage. It should be noted that, while logic 210 and 212, and data store 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

It should be understood that during a live event a complete manifest may not be available. According to a particular implementation, live manifests are obtained by periodically querying the packager instances for the latest manifest information (e.g., every two minutes). As fragments are encoded and packaged during the live event, live manifests may be provided to the client having the latest manifest information. In some implementations live manifests are appended to include the latest manifest information as well as all prior manifest information. In other implementations, live manifests may only provide manifest information for content fragments at the live edge.

Figure 3:
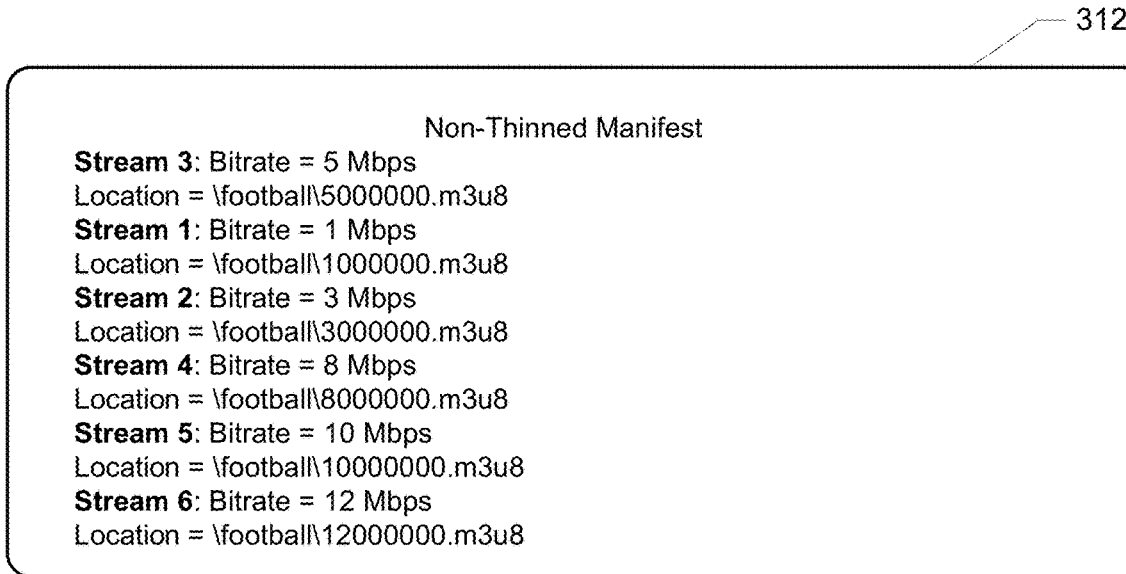
FIG. 3 presents an illustration of a thinned manifest.
Figure 3:
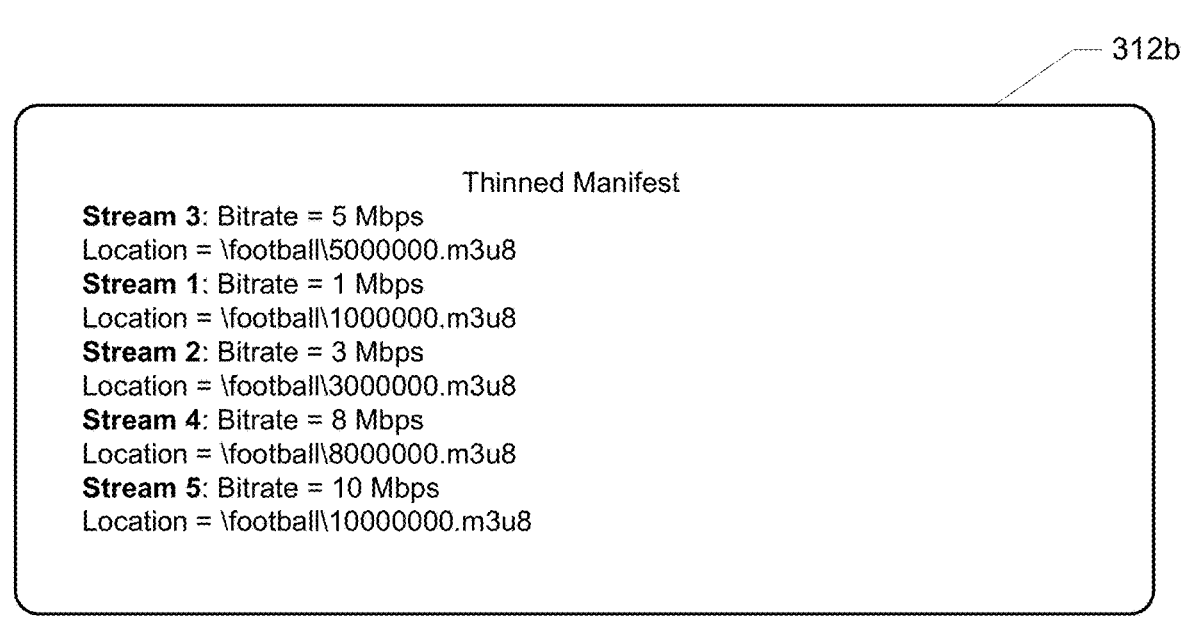

An example of a thinned manifest according to particular implementation is illustrated in FIG. 3. Manifest 312*a* is a non-thinned manifest, having all playback options available, e.g., 6 bitrate options in this example. Manifest 312*b* is a version of manifest 312*a* that has one stream removed, i.e., a thinned manifest. While only one stream has been removed in manifest 312*b*, it should be understood that more than one stream or bitrate may be removed to create a thinned manifest.

Manifests 312*a-b* are manifests for a live event. A live event may be, for example, a sporting event or a concert. The video and audio components of such content may be captured using cameras and microphones and a variety of other technologies to generate various auditory and/or visual elements of the content, which are then encoded and packaged for delivery to client devices. Consumption of the streams of live content by a population of client devices is enabled by live manifests provided to the client devices that are periodically generated and/or updated by the content service providing the live content. These live manifests may be generated by or derived from information provided by the packagers of the respective content streams.

In various implementations manifests 312*a-b* may be "master manifests," in that they contain the locations of sub-manifests for each content stream. Each sub-manifest may then be retrieved and provide additional information on the location of fragments for that content stream. In such embodiments, thinned manifest 312*b* omits the location of one or more sub-manifests, such that a client device cannot retrieve the removed sub-manifests. In other implementations, manifests 312*a-b* may instead contain the location of fragments for each content stream without the use of sub-manifests.

In various implementations thinned manifests are generated according to a bitrate limit. A bitrate limit sets the maximum bitrate for a thinned manifest, and all bitrates above the bitrate limit are removed to generate the corresponding thinned manifest. Thus, when a client receives a thinned manifest, it is unaware that the removed bitrate options are available and cannot request such options. In some implementations the bitrate limit does not have to match any bitrates in a manifest being thinned; if the bitrate limit is between the bitrates for two content streams, the content stream with a higher bitrate will be removed while the content stream with a lower bitrate is not. In the example manifest 312*b* of FIG. 3, the bitrate limit could be any value between 10 Mbps and 12 Mbps, resulting in the removal of stream 6 but not stream 5.

In some implementations, the bitrates provided in a manifest or the bitrate limits used to effect thinning may need to be adjusted during thinning. For example, different streaming technologies, e.g., DASH, HLS, or MSS, may have slightly different definitions of bitrate in a manifest despite packaging the same content. In particular, HLS playlist bitrate values may be higher than DASH or MSS manifest bitrate values by about 10-20% or more. This may be due to HLS values including additional stream bitrates in these values, e.g., audio or subtitle streams, compared to DASH or MSS. Because of these differences it is possible that, for a particular bitrate limit, a thinned DASH manifest might have a different number of bitrate options than a thinned HLS playlist, despite the underlying primary content having the same or similar bitrates. Therefore, to provide uniform thinning between different types of manifests or playlists, the bitrate values for one streaming technology may be adjusted so that the number of bitrate options are uniform across different streaming technologies.

In some implementations this adjustment may be a multiplier applied to the bitrates in the manifest while determining if that bitrate option should be removed. In some implementations, the adjustment may be a subtraction of bitrates for non-video parts of the content stream. Alternatively, the bitrate limit may also be adjusted instead of the bitrates values. In some implementations the bitrate options between the different streaming technologies, e.g., HLS and DASH, may be mapped. In such implementations, a bitrate limit may be set for generating thinned manifests for one streaming technology, e.g., DASH, and a separate bitrate limit may be set for generating thinned manifests for another streaming technology, e.g. HLS. The separate bitrate limit may be determined based on the bitrate limit and the mapping between the manifests to ensure both manifests have the same number of bitrate options after thinning. Importantly, while the bitrate values may be adjusted for the purpose of determining whether to remove one or more bitrate options from the manifest, the bitrate options in a thinned manifest have the same bitrates and other parameters as the corresponding bitrate options in a non-thinned manifest.

In some implementations, a thinned manifest has the same content fragment paths as a non-thinned manifest. Latency during a live event is an important metric to minimize the time between capture and playback. One way to reduce latency is to cache fragments at edge servers, such that multiple clients may retrieve the same fragments using the same pathname. Thinned manifests may be generated such that the fragment paths generated from an non-thinned manifest and a thinned manifest are the same. Furthermore, in some implementations the order of bitrate options in an non-thinned manifest and a thinned manifest may remain the same. A media player starting a session may have insufficient information to select a bitrate option according to an adaptive bitrate algorithm, and thus streaming may begin based on the first listed playback option. For example, returning to FIG. 3, both manifests 312*a-b* list Stream 3 first, and Stream 3 will be used at the start of a session using either manifest.

Figure 4:
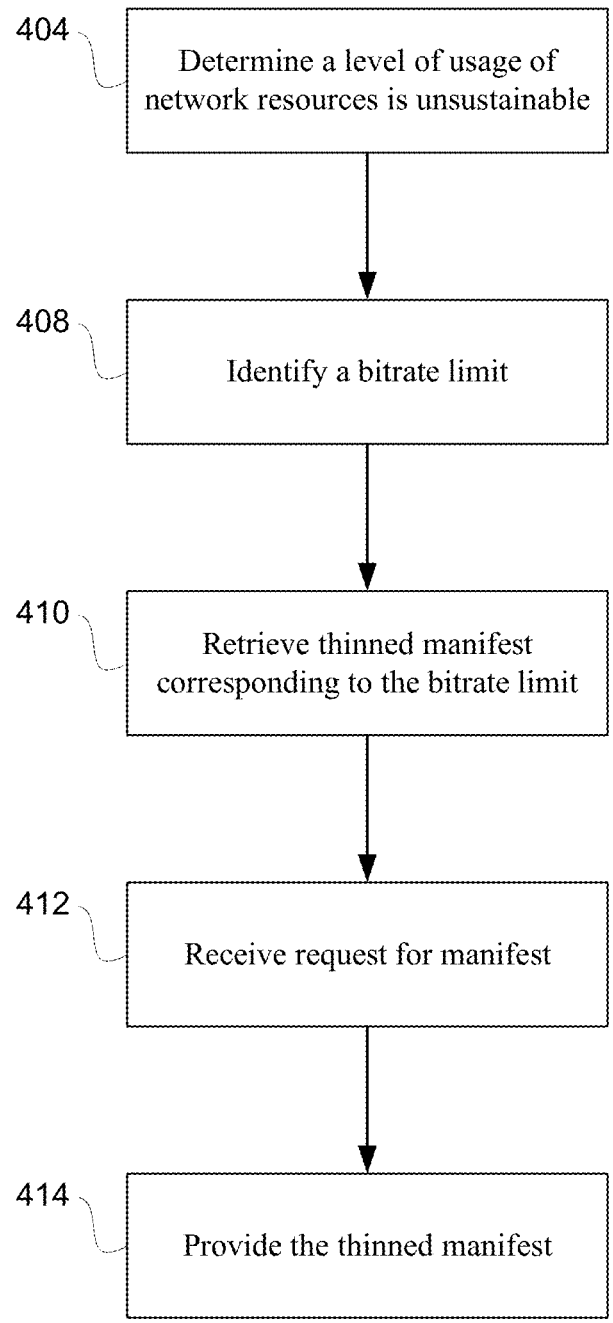
FIG. 4 presents a flowchart illustrating operation of an example of an implementation as described herein.

FIG. 4 is a flowchart for bitrate thinning according to various implementations herein. Starting in block 404, it is determined that the level of usage of network resources is unsustainable. In some implementations, this may result from monitoring present network conditions for a live event. The network resources that are monitored may be for a geographic region of an ISP or a CDN. In some implementations, various quality of service (QoS) metrics are monitored. In some implementations, the determination may be based on one or more QoS metrics exceeding a threshold. In other embodiments, the determination may be based on projections of network usage for a live event. For example, the current number of sessions, the average bandwidth of each session, and the projected increase in the number of sessions may be monitored to determine if an ISP and/or CDN will exceed capacity.

In some implementations, the QOS metrics may be one or more of zero buffer rate (ZBR), zero error rate (ZER), and time to first frame. ZBR refers to how many sessions experience a buffer, typically expressed as a percentage. ZER refers to how many sessions experience an error, typically expressed as a percentage. Time to first frame may refer to how much time elapses from starting a session and presenting the first frame. A ZBR and ZER of 100% indicates no sessions are experiencing any buffering events or errors. In some implementations, the determination that the level of network resources is unsustainable may be in response to a notification that the ZBR and/or ZER have fallen below a threshold value, e.g., 99%, 95%, or 90%. In some implementations, there may be multiple ZER/ZBR thresholds, corresponding with multiple bitrate limits. In some implementations, the ZBR and ZER thresholds may be different thresholds. In some implementations, the thresholds for any QOS metrics may be different for different streaming technologies, e.g., HLS or DASH.

In some implementations, the determination is based on input received from a separate system component. In such implementations, the separate component may provide a bitrate limit that is automatically passed to manifest thinning logic for generating thinned manifests. The separate component may identify a bitrate limit based on the QoS metrics described above. In some implementations, the determination is based on input received from an administrator of the ISP and/or CDN.

In block 408, a bitrate limit is identified. The bitrate limit may be identified based on the level of network usage, the various QoS metrics, or received as input from an administrator. The bitrate limit defines the maximum bitrate option that a thinned manifest may include. As noted above, the bitrate limit does not have to correspond with the specific value of any particular bitrate option in a manifest. In some implementations, the bitrate limits may be determined prior to the live event, based on e.g., the expected bitrate options during the live event. In some implementations, the bitrate limit is determined dynamically based on present network conditions as described herein. In implementations where thinned manifests are pre-published, the bitrate limit identified in block 408 may correspond to one of the pre-published thinned manifests.

In block 410, a thinned manifest is retrieved corresponding to the bitrate limit. In some implementations, thinned manifests may be pre-published. This may be useful, for example, for events that may be high velocity or expected to require significant network resources. In some implementations, the determination to pre-publish thin manifests may be based on projected traffic or concurrent streams for the live event and the capacity of an ISP and/or CDN. In such implementations, one or more bitrate limits, and corresponding thinned manifests, may be generated for potential use during the live event prior to the live event. In such implementations, block 410 may involve selecting from one of the pre-published thinned manifests.

Furthermore, the thinned manifest selected from the pre-published manifests may be the next least restrictive. For example, if thinned manifests based on bitrate limits of 8, 10, and 12 Mbps are pre-published, the thinned manifest having a bitrate limit of 12 Mbps would be retrieved prior to the thinned manifest with a bitrate limit of 10 Mbps, and so on. Alternatively, the selection may skip a less restrictive option in favor of a more restrictive option depending, for example, on the level of network usage.

In some implementations, the thinned manifest is generated dynamically based on the network conditions during the live event. In such implementations, rather than retrieving a pre-published manifest, a thinned manifest is generated based on the bitrate limit identified in block 408. As discussed above, in some implementations the thinned manifest may be generated based on adjustments to the bitrates or bitrate limit to account for differences among different streaming technologies such as DASH or HLS.

In block 412, new sessions begin, each requesting a manifest for the live event. In block 414, the thinned manifest retrieved in 410 is provided to the new sessions. As the thinned manifest does not have bitrate options above the bitrate limit identified in 408, the new sessions cannot request fragments at bitrates higher than the bitrate limit. In some implementations, the new sessions continue to use the thinned manifest for the remainder of each session.

In some implementations, providing a thinned manifest includes providing the thinned manifest with a filename that corresponds to the thinned manifest. For example, a non-thinned manifest may have a filename of football.m3u8, while a thinned manifest may have a filename of football-thin-12000000.m3u8. The addition of "-thin-12000000" indicates that a thinned manifest should be provided having a bitrate limit of 12 Mbps. When a client requests manifest updates for the most recently encoded fragments, the request, based on the filename, results in only updates for the thinned manifest being provided. Thus, existing sessions continue to request updated manifest data based on the initially provided manifest, even if a different thinned manifest is currently provided to new sessions. In some implementations, fragment paths for a particular content fragment between the non-thinned manifest and each of the thinned manifests are the same, allowing for caching efficiency by using the same cached fragment for the non-thinned and thinned manifests.

In some implementations, thinned manifests are only provided to new sessions. This approach may be useful in that some media players for current sessions may fail when removing bitrate options from a manifest that were previously available. In other implementations, media players for current sessions may be prompted or forced to start new sessions, thereby transitioning current sessions to thinned manifests. In some implementations, current sessions may fail due to, e.g., being unable to download content, thus starting a new session using a thinned manifest. In some implementations, current sessions may be transitioned to thinned manifests without starting new sessions.

In some implementations, the process of FIG. 4 may be repeated throughout a live event. For example, there may be multiple thresholds of network usage, and as each threshold is exceeded a lower bitrate limit is identified for thinning manifests. In some implementations, the thinned manifests have been previously generated, and identifying a bitrate limit is selecting among the previously generated thinned manifests. In various implementations, the level of usage of network resources may decrease, such that an identified bitrate limit may be increased, and new and/or current sessions may be provided with manifests having higher bitrate options, thus reversing previous thinning.

In some implementations, thinned manifests may be used to manage network resources for multiple live events simultaneously, e.g., multiple sports games being broadcast simultaneously. In some implementations, a single bitrate limit may be set to manage the network resource usage collectively for all of the live events sent over a particular ISP and/or CDN. In other implementations bitrate limits may be set differently for each event. Different bitrate limits might be used, for example, in situations where it is desirable to treat the live events differently in terms of each event's impact on network resources. For example, one live event might benefit more from or require a higher bitrate limit than another live event.

In some implementations thinned manifests may be include references to secondary content, e.g., advertisements. Ad insertion may be performed on the client side or the server side. For server-side ad insertion, references to secondary content may be added to a thinned manifest that correspond with the bitrate limit of the thinned manifest. In some implementations, secondary content insertion may be performed by matching bitrate options of secondary content to bitrate options present in the thinned manifests. In this manner, the bitrate options of the secondary content do not exceed the bitrate limit, as there is no bitrate option of the live event above the bitrate limit to be matched. In other implementations, the bitrate limit may be provided to source of secondary content so that no fragment references provided by the source of the secondary content exceed the bitrate limit.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising memory and one or more processors configured to:
   send first manifest data to a first device, wherein the first manifest data corresponds to a first set of bitrate options representing a live event;
   receive a first request for additional first manifest data from the first device, wherein the first request corresponds to the first set of bitrate options;
   after sending the first manifest data, identify a bitrate limit associated with the live event;
   after identifying the bitrate limit, initiate a new session with a second device by sending second manifest data, wherein the second manifest data corresponds to a second set of bitrate options, wherein the second set of bitrate options includes a first bitrate option included in the first set of bitrate options, wherein the second set of bitrate options does not include a second bitrate option included in the first set of bitrate options, wherein the second bitrate option is above the bitrate limit;
   receive a second request for additional second manifest data from the second device, wherein the second request indicates the bitrate limit,;
   provide additional first manifest data to the first device, wherein the additional first manifest data includes representations of the first set of bitrate options;
   provide additional second manifest data to the second device, wherein the additional second manifest data includes representations of the second set of bitrate options;
   conduct a first streaming session with the first device based on requests received from the first device based on the first manifest data;
   conduct a second streaming session with the second device based on requests received from the second device based on the second manifest data;
   cache a first fragment corresponding to the first bitrate option;
   provide the cached first fragment to the first device as part of the first streaming session;

provide the cached first fragment to the second device as part of the second streaming session; and after providing the cached first fragment to the second device as part of the second streaming session, provide a second fragment to the first device as part of the first streaming session, wherein the second fragment corresponds with the second bitrate option.

2. The system of claim 1, wherein the one or more processors are further configured to:

receive a request for the first fragment from the first device; and receive a request for the first fragment from the second device, wherein the request for the first fragment from the first device and the request for the first fragment from the second device both indicate a same fragment path for the first fragment.

3. The system of claim 1, wherein the first manifest data and the second manifest data correspond to media content depicting a live event.

4. The system of claim 1, wherein the one or more processors are further configured to generate the second manifest data by modifying the first manifest data to remove the second bitrate option.

5. The system of claim 1, wherein the second bitrate option is above a first bitrate limit, wherein the first bitrate limit corresponds to a first level of usage of network resources.

6. The system of claim 1, wherein the additional second manifest data comprises updated manifest data for previously provided manifest data.

7. The system of claim 1, wherein the one or more processors are further configured to:

cause the first device to transition to a new streaming session; and provide the second manifest data to the first device.

8. The system of claim 1, wherein the one or more processors are further configured to modify the second manifest data to include references to secondary content that comply with the second set of bitrate options.

9. The system of claim 1, wherein the second manifest data includes representations of a subset of bitrate options of master manifest data.

10. A method, comprising sending first manifest data to a first device, wherein the first manifest data corresponds to a first set of bitrate options representing a live event;

receiving a first request for additional first manifest data from the first device, wherein the first request corresponds to the first set of bitrate options;

after sending the first manifest data, identifying a bitrate limit associated with the live event;

after identifying the bitrate limit, initiating a new session with a second device by sending second manifest data, wherein the second manifest data corresponds to a second set of bitrate options, wherein the second set of bitrate options includes a first bitrate option included in the first set of bitrate options, wherein the second set of bitrate options does not include a second bitrate option included in the first set of bitrate options, wherein the second bitrate option is above a bitrate limit;

receiving a second request for additional second manifest data from the second device, wherein the second request indicates the bitrate limit;

providing additional first manifest data to the first device, wherein the additional first manifest data includes representations of the first set of bitrate options;

providing additional second manifest data to the second device, wherein the additional second manifest data includes representations of the second set of bitrate options;

conducting a first streaming session with the first device based on requests received from the first device based on the first manifest data;

conducting a second streaming session with the second device based on requests received from the second device based on the second manifest data;

caching a first fragment corresponding to the first bitrate option;

providing the cached first fragment to the first device as part of the first streaming session;

providing the cached first fragment to the second device as part of the second streaming session; and after providing the cached first fragment to the second device as part of the second streaming session, providing a second fragment to the first device as part of the first streaming session, wherein the second fragment corresponds with the second bitrate option.

11. The method of claim 10, further comprising:

receiving a request for the first fragment from the first device; and receiving a request for the first fragment from the second device, wherein the request for the first fragment from the first device and the request for the first fragment from the second device both indicate a same fragment path for the first fragment.

12. The method of claim 10, wherein the first manifest data and the second manifest data correspond to media content depicting a live event.

13. The method of claim 10, further comprising generating the second manifest data by modifying the first manifest data to remove the second bitrate option.

14. The method of claim 10, wherein the second bitrate option is above a first bitrate limit, wherein the first bitrate limit corresponds to a first level of usage of network resources.

15. The method of claim 10, wherein the additional second manifest data comprises updated manifest data for previously provided manifest data.

16. The method of claim 10, further comprising:

causing the first device to transition to a new streaming session; and providing the second manifest data to the first device.

17. The method of claim 10, further comprising modifying the second manifest data to include references to secondary content that comply with the second set of bitrate options.

18. The method of claim 10, wherein the second manifest data includes representations of a subset of bitrate options of master manifest data.

* * * * *